(12) United States Patent
Felix et al.

(10) Patent No.: US 11,294,635 B2
(45) Date of Patent: Apr. 5, 2022

(54) PSEUDO-RANDOM NUMBER GENERATOR

(71) Applicant: Graphcore Limited, Bristol (GB)

(72) Inventors: Stephen Felix, Bristol (GB); James William Hanlon, Bristol (GB)

(73) Assignee: Graphcore Limited, Bristol (GB)

(*) Notice: Subject to any disclaimer, the term of this patent is extended or adjusted under 35 U.S.C. 154(b) by 323 days.

(21) Appl. No.: 16/395,434

(22) Filed: Apr. 26, 2019

(65) Prior Publication Data

US 2020/0201604 A1  Jun. 25, 2020

(30) Foreign Application Priority Data

Dec. 21, 2018 (GB) .................................. 1821102

(51) Int. Cl.
*G06F 7/58* (2006.01)
*G06N 3/08* (2006.01)

(52) U.S. Cl.
CPC ............... *G06F 7/582* (2013.01); *G06N 3/08* (2013.01)

(58) Field of Classification Search
CPC .................................. G06F 7/58; G06F 7/582
USPC ........................................ 708/250, 253, 256
See application file for complete search history.

(56) References Cited

U.S. PATENT DOCUMENTS

| | | | | |
|---|---|---|---|---|
| 4,928,310 A | * | 5/1990 | Goutzoulis | H03K 3/84 331/78 |
| 5,963,104 A | * | 10/1999 | Buer | G06F 7/588 331/78 |
| 6,266,331 B1 | * | 7/2001 | Baker | H04B 1/707 370/335 |
| 2003/0125015 A1 | * | 7/2003 | Inoue | H04L 9/0662 455/411 |
| 2007/0258593 A1 | | 11/2007 | Hepler | |
| 2012/0233232 A1 | * | 9/2012 | Vergnes | G06F 7/584 708/251 |

OTHER PUBLICATIONS

Combined Search and Examination Report dated Sep. 25, 2019 for United Kingdom Patent Application No. GB1821102.9. 7 pages.
Examination Report dated Dec. 7, 2021 for United Kingdom Patent Application No. GB1821102.9. 4 pages.
Search Report dated Dec. 7, 2021 for United Kingdom Patent Application No. GB1821102.9. 3 pages.

\* cited by examiner

*Primary Examiner* — Emily E Larocque
(74) *Attorney, Agent, or Firm* — Haynes and Boone, LLP

(57) ABSTRACT

A pseudo random number generator implemented in hardware. The pseudo random number generator comprises a state post processing circuit for processing two state values to produce a random number. The circuit having a first combinatorial logic comprising a XOR or XNOR gate configured to process a first pair of bits from the state values, a second combinatorial logic comprising an OR or AND gate configured to process a second pair of bits from the state value, and third combinatorial logic comprising an OR or AND gate configured or process a third pair of bits from the state value. The circuit has fourth combinatorial logic configured to process the outputs of the first three set of combinatorial logic so as to provide a result bit of the random number. The fourth combinatorial logic comprises an AND or OR gate and a XOR or XNOR gate.

23 Claims, 11 Drawing Sheets

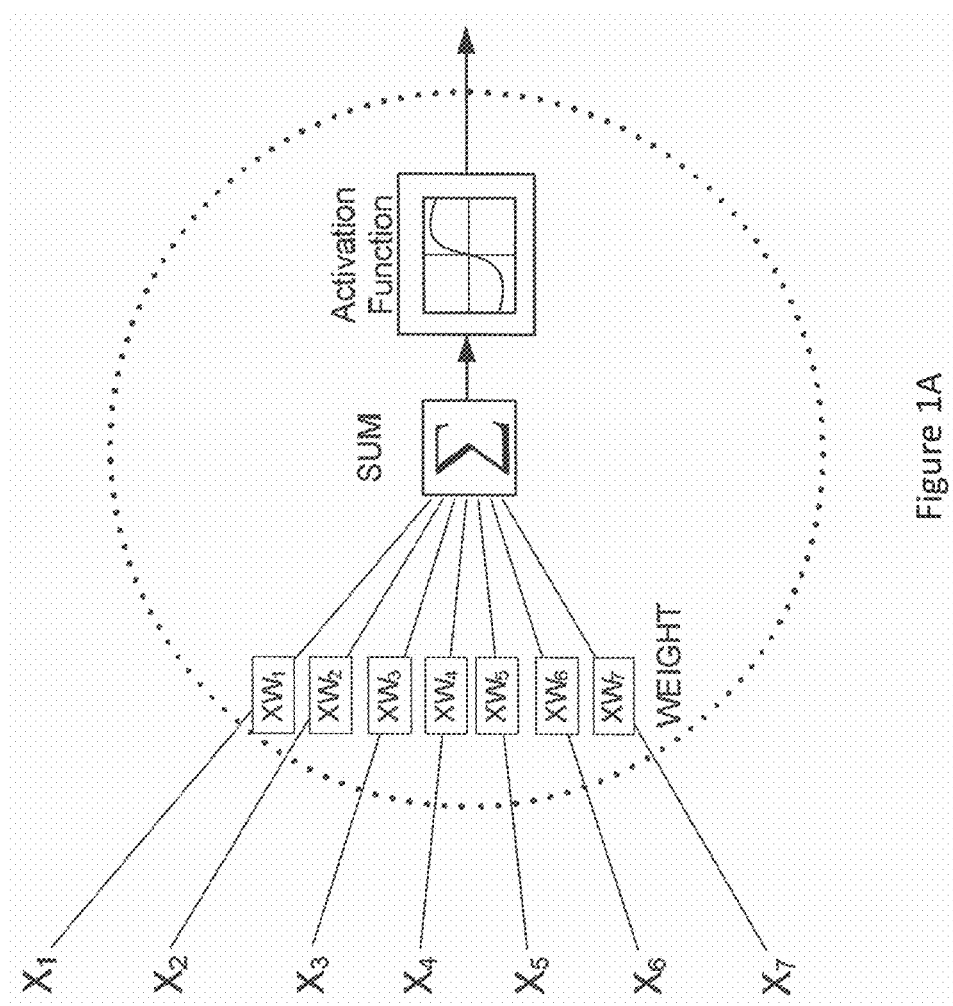

PSEUDO-RANDOM NUMBER GENERATOR

CROSS-REFERENCE TO RELATED APPLICATIONS

This application claims the priority benefit under 35 U.S.C. § 119 of United Kingdom Patent Application No. 1821102.9, filed Dec. 21, 2018, the entire contents of which are incorporated herein by reference.

TECHNICAL FIELD

The present disclosure relates to a pseudo-random number generator.

BACKGROUND

Random number have many different uses when performing processing using neural networks.

Neural networks are used in the field of machine learning and artificial intelligence. Neural networks comprise arrangements of sets of nodes which are interconnected by links and which interact with each other. The principles of neural networks in computing are based on information about how electrical stimuli convey information in the human brain. For this reason the nodes are often referred to as neurons. They may also be referred to as vertices. The links are sometimes referred to as edges. The network can take input data and certain nodes perform operations on the data. The result of these operations is passed to other nodes. The output of each node is referred to as its activation or node value. Each link is associated with a weight. A weight defines the connectivity between nodes of the neural network. Many different techniques are known by which neural networks are capable of learning, which takes place by altering values of the weights.

FIG. 1 shows an extremely simplified version of one arrangement of nodes in a neural network. This type of arrangement is often used in learning or training and comprises an input layer of nodes, a hidden layer of nodes and an output layer of nodes. In reality, there will be many nodes in each layer, and nowadays there may be more than one layer per section. Each node of the input layer Ni is capable of producing at its output an activation or node value which is generated by carrying out a function on data provided to that node. A vector of node values from the input layer is scaled by a vector of respective weights at the input of each node in the hidden layer, each weight defining the connectivity of that particular node with its connected node in the hidden layer. In practice, networks may have millions of nodes and be connected multi-dimensionally, so the vector is more often a tensor. The weights applied at the inputs of the node Nh are labelled w0 . . . w2. Each node in the input layer is connected at least initially to each node in the hidden layer. Each node in the hidden layer can perform an activation function on the data which is provided to it and can generate similarly an output vector which is supplied to each of the nodes $N_O$ in the output layer $N_O$. Each node weights its incoming data, for example by carrying out the dot product of the input activations of the node and its unique weights for the respective incoming links. It then performs an activation function on the weighted data. The activation function can be for example a sigmoid. See FIG. 1A. The network learns by operating on data input at the input layer, assigning weights to the activations from each node and acting on the data input to each node in the hidden layer (by weighing it and performing the activation function). Thus, the nodes in the hidden layer operate on the weighted data and supply outputs to the nodes in the output layer. Nodes of the output layer may also assign weights. Each weight is characterised by a respective error value. Moreover, each node may be associated with an error condition. The error condition at each node gives a measure of whether the error in the weight of the node falls below a certain level or degree of acceptability. There are different learning approaches, but in each case there is a forward propagation through the network from left to right in FIG. 1, a calculation of overall error, and a backward propagation from right to left in FIG. 1 through the network of the error. In the next cycle, each node takes into account the back propagated error and produces a revised set of weights. In this way, the network can be trained to perform its desired operation.

When processing large datasets using neural nets, there are techniques involving the use of random numbers which can improve their performance. One technique is so-called Monte Carlo sampling which is a term used for a broad class of computational algorithms that rely on repeated random sampling to obtain numerical results. The underlying idea of Monte Carlo sampling is that randomness may be able to solve problems that might be deterministic in principle. When using Monte Carlo sampling, a prescribed probability distribution of the random numbers is desirable. Monte Carlo sampling can be used for example in generative models.

Techniques have recently been devised for improving the performance of neural networks by adding random noise to weights or activations. Gaussian noise has been explored as a possibility in this respect. Techniques described herein for generating random numbers can be used to generate Gaussian noise as described in our earlier U.S. application Ser. No. 15/886505, the contents of which are herein incorporated by reference.

Another technique requiring the use of a random number is known as "Drop connect" and is discussed in the paper entitled "Regularisation of Neural Network using Drop connect" authored by Li Wan et al published by the Department of Computer Science NYU. According to this technique, a subset of weights are randomly zeroed for each training example, during forward propagation. This technique has similarly been shown to improve the performance of neural networks. A technique for implementing drop connect is described in our earlier U.S. application Ser. No. 15/886331, the contents of which are herein incorporated by reference.

Random number generators may be divided into two categories, true random number generators, and pseudo-random number generators. True random number generators exploit an inherently random physical phenomenon, such as radioactive decay or thermal noise, to provide truly random values. In contrast, a pseudo-random number generator (PRNG) uses a set of deterministic operations to iterate a set of bits through a finite number of states, starting from a seed value that is fed into the PRNG. Although the PRNG is not truly random, it is often considered more useful than a true random number generator in many computing scenarios as its deterministic nature allows for debugging. A programmer who has knowledge of the initial seed fed into the PRNG and the algorithm that operates on this seed, is able to determine the values that will be output from the PRNG. This is not possible with a true random number generator.

Implementing pseudo-random number generators has certain challenges.

When implementing a pseudo random number generator (PRNG), certain requirements must be considered. A battery of tests, collectively known as "Big Crush" has been developed to test random number generators and the degree to which they meet these requirements.

One of the requirements is uniformity of the probability distribution (also known as equidistribution). In other words, the probability that the PRNG outputs any particular value should be the same as outputting any other value that is within the output range of the PRNG.

Another requirement is that the output of the PRNG is not a linear function of the previous outputs. In Boolean algebra, a function is linear if each input either always affects the output or never affects the output. For example, an exclusive-OR function is linear whereas an AND is non-linear.

One proposed PRNG for implementation in software involves outputting two 64 bit values of state and summing these two values to produce a random number for output by the PRNG. The processing of these two 64 bits of state is illustrated in part by FIG. 3 which, for convenience, illustrates only the 10 least significant bits. The Figure shows the addition of a first value 310 to a second value 320 to produce a third value 330. This summation has the effect that 63 bits of the 64 bit output are non-linear functions of the first 310 and second 320 values. However, the least significant bit 340 of the output value 330 is, in this case, a linear function of the least significant bits of the first value 310 and the second value 320.

Additionally, although this proposed PRNG shows no systematic failures when the output is bit reversed, systematic failures are observed when the least significant 32 bits are reversed (i.e. output bits [31:16] and [15:0] are swapped). In other words, this proposed PRNG fails the matrix rank test of Big Crush.

Furthermore, this proposed PRNG is a software implementation that makes use of addition functions that typically require a large number of logic gates with a significant logic delay when implemented in hardware. Although a software implementation may appear simpler, the instructions need to be loaded into a processor and executed each time a random number is needed. Therefore, implementing a PRNG in software instead of hardware may lead to less efficient generation of random numbers. However, in order to implement a PRNG in hardware, it is desirable to avoid performing addition operations, as in the proposed software PRNG, due to the demands placed on the hardware resources.

Embodiments of the application may address one or more of these issues.

SUMMARY

According to a first aspect, there is provided a pseudo random number generator comprising: a first register holding a first value as a bit sequence; a second register holding a second value as a bit sequence; first combinatorial logic for combining a first pair of bits at corresponding locations in the first and second values to generate a first intermediate bit; second combinatorial logic for combining a second pair of bits at corresponding locations in the first and second values to generate a second intermediate bit; third combinatorial logic for combining a third pair of bits at corresponding locations in the first and second values to generate a third intermediate bit; and fourth combinatorial logic for combining the first intermediate bit, second intermediate bit, and third intermediate bit to generate a first bit of a third value.

In some embodiments, the pseudo random number generator comprises fifth combinatorial logic configured to combine a fourth pair of bits of the first value to generate a fifth intermediate bit, wherein one of the bits of the fourth pair also belongs to the second pair of bits and the other of the bits of the fourth pair also belongs to the third pair of bits.

In some embodiments, the fourth combinatorial logic is configured to combine the first, second, third, and fifth intermediate bits to generate the first bit of the third value.

In some embodiments, the fourth combinatorial logic is configured to: combine the second intermediate bit and the third intermediate bit to form a fourth intermediate bit; and combine the first intermediate bit with the fourth intermediate bit to form the first bit of the third value.

In some embodiments, the fourth combinatorial logic is configured to: combine the second intermediate bit, third intermediate bit, and the fifth intermediate bit to form a fourth intermediate bit; and combine the first intermediate bit with the fourth intermediate bit to form the first bit.

In some embodiments, the pseudo random number generator is configured to apply a function implemented by the first combinatorial logic, the second combinatorial logic, the third combinatorial logic, and the fourth combinatorial logic to calculate each bit of the third value, wherein the function is configured to calculate each bit of the third value using a unique set of three bits from the first value and a unique set of three bits from the second value.

In some embodiments, the function is additionally implemented by the fifth combinatorial logic.

In some embodiments, the pseudo random number generator comprises, multiple sets of the first combinatorial logic, the second combinatorial logic, the third combinatorial logic, and the fourth combinatorial logic, wherein each set is used to calculate a different bit of the third value.

In some embodiments, each pair of bits from the first value and the second value is input to the first combinatorial logic, the second combinatorial logic, and the third combinatorial logic of different sets of the multiple sets to generate three respective bits of the third value.

In some embodiments, for each pair of bits, inputting the pair of bits to the second combinatorial logic and the third combinatorial of different sets of the multiple sets comprises inputting the pair of bits to a single AND gate or a single OR gate to produce an output used for generating two different bits of the third value.

In some embodiments, the first combinatorial logic, the second combinatorial logic, the third combinatorial logic, and the fourth combinatorial logic comprise at least one of: one or more application specific integrated circuits; and one or more field programmable gate arrays.

According to a second aspect, there is provided a pseudo random number generator comprising: a first register holding a first value as a bit sequence; a second register holding a second value as a bit sequence, wherein the pseudo random number generator comprises: a first gate comprising either a XOR gate or an XNOR gate and configured to receive as inputs: a first bit of the first value; and a first bit of the second value; a configuration comprising a layer of at least one AND gate and a layer of at least one OR gate, said configuration being configured to receive as inputs: a second bit of the first value; a second bit of the second value; a third bit of the first value; and a third bit of the second value; and a second gate comprising either a XOR gate or an XNOR gate and configured to receive as inputs: an output of the first gate; and an output of the configuration, wherein the second gate is configured to output a first bit of the third value.

In some embodiments, the layer of at least one AND gate comprises a first AND gate and a second AND gate, wherein the layer of at least one OR gate comprises a first OR gate, wherein the first AND gate is configured to receive as inputs: the second bit of the first value; and the second bit of the second value, wherein the second AND gate is configured to receive as inputs; the third bit of the first value; and the third bit of the second value, wherein the first OR gate is configured to receive as inputs: an output of the first AND gate; and an output of the second AND gate, wherein the first OR gate is configured to provide the output of the configuration.

In some embodiments, the layer of at least one OR gate comprises a first OR gate and a second OR gate, wherein the layer of at least one AND gate comprises a first AND gate, wherein the first OR gate is configured to receive as inputs: the second bit of the first value; and the second bit of the second value, wherein the second OR gate is configured to receive as inputs: the third bit of the first value; and the third bit of the second value; wherein the first AND gate configured to receive as inputs: an output of the first OR gate; and an output of the second OR gate, wherein the first AND gate is configured to provide the output of the configuration.

In some embodiments, the layer of at least one AND gate comprises a first AND gate, a second AND gate, and a third AND gate, wherein the layer of at least one OR gate comprises a first OR gate, wherein the first AND gate is configured to receive as inputs: the second bit of the first value; and the second bit of the second value, wherein the second AND gate is configured to receive as inputs: the third bit of the first value; and the third bit of the second value, wherein the third AND gate is configured to receive as inputs: the second bit of the first value; and the third bit of the first value, wherein the first OR gate is configured to receive as inputs: an output of the first AND gate; an output of the second AND gate; and an output of the third AND gate, wherein the first OR gate is configured to provide the output of the configuration.

In some embodiments, the layer of at least one OR gate comprises a first OR gate, a second OR gate, and a third OR gate, wherein the layer of at least one AND gate comprises a first AND gate, wherein the first OR gate is configured to receive as inputs: the second bit of the first value; and the second bit of the second value, wherein the second OR gate is configured to receive as inputs: the third bit of the first value; and the third bit of the second value, wherein the third OR gate is configured to receive as inputs: the second bit of the first value; and the third bit of the first value, wherein the first AND gate is configured to receive as inputs: an output of the first OR gate; an output of the second OR gate; and an output of the third OR gate, wherein the first AND gate is configured to provide the output of the configuration.

In some embodiments, the first gate, second gate, and configuration comprise at least one of: one or more application specific integrated circuits; and one or more field programmable gate arrays.

In some embodiments, the pseudo random number generator is configured to calculate each bit of the third value using a function implemented by the first gate, the configuration, and the second gate, wherein the pseudo random number generator is configured to use the function to calculate each bit of the third value using a unique set of three bits from the first value and a unique set of three bits from the second value.

In some embodiments, the pseudo random number generator comprises multiple sets of the first gate, the configuration, and the second gate, wherein the different sets are used to calculate different bits of the third value.

In some embodiments, the pseudo random number generator is configured to for each of the pairs of bits, input the pair of bits to the first gate of a first set, the configuration of a second set, and the configuration of a third set to generate three respective bits of the third value, wherein the first set, second set, and third set are different for different pairs of bits.

In some embodiments, for each pair of bits, inputting the pair of bits to the configurations of the second set and the third set comprises inputting the pair of bits to a single AND gate or a single OR gate to produce an output used for generating two different bits of the third value.

In some embodiments, the first value, second value and third value each comprise 64 bits.

In some embodiments, the pseudo random number generator comprises a circuit configured to discard two bits of the third value.

In some embodiments, the pseudo random number generator comprises a third register configured to store the third value, wherein the first bit is stored at a location in the third value corresponding to the location of the first pair of bits in the first and second value.

In some embodiments, the pseudo random number generator comprises a state update circuit configured to update and output state every iteration of the state update circuit, the state comprising the first value and the second value.

In some embodiments, the state update circuit is configured to: receive a 32-bit seed; and initialise the state from the 32-bit seed, wherein the state comprises 128 bits.

In some embodiments, the state update circuit is configured to: calculate and store a 32-bit seed from the state; and subsequently, reinitialise the state from the 32-bit seed, wherein the state comprises 128 bits.

According to a third aspect, there is provided a method for generating random numbers comprising: holding in a first register, a first value as a bit sequence; holding in a second register, a second value as a bit sequence; combining a first pair of bits at corresponding locations in the first and second values to generate a first intermediate bit; combining a second pair of bits at corresponding locations in the first and second values to generate a second intermediate bit; combining a third pair of bits at corresponding locations in the first and second values to generate a third intermediate bit; and combining the first intermediate bit, second intermediate bit, and third intermediate bit to generate a first bit of a third value.

According to a fourth aspect, there is provided a method for generating random numbers comprising: holding a first value as a bit sequence; holding a second value as a bit sequence, receiving as inputs at a first gate comprising either a XOR gate or an XNOR gate: a first bit of the first value; and a first bit of the second value; receiving as inputs at a configuration comprising a layer of at least one AND gate and a layer of at least one OR gate: a second bit of the first value; a second bit of the second value; a third bit of the first value; and a third bit of the second value; receiving as inputs at a second gate comprising either a XOR gate or an XNOR gate: an output of the first gate; and an output of the configuration; and outputting from the second gate a first bit of the third value.

According to a fifth aspect, there is provided a computer program product comprising a computer program which comprises a computer program instruction recorded on non-transitory media which when executed carries out a method of generating random numbers, the method comprising: holding in a first register, a first value as a bit sequence; holding in a second register, a second value as a bit sequence; combining a first pair of bits at corresponding locations in the first and second values to generate a first intermediate bit; combining a second pair of bits at corresponding locations in the first and second values to generate a second intermediate bit; combining a third pair of bits at corresponding locations in the first and second values to generate a third intermediate bit; and combining the first intermediate bit, second intermediate bit, and third intermediate bit to generate a first bit of a third value.

According to a sixth aspect, there is provided a computer program product comprising a computer program which comprises a computer program instruction recorded on non-transitory media which when executed carries out a method of generating random numbers, the method comprising: holding a first value as a bit sequence; holding a second value as a bit sequence, receiving as inputs at a first gate comprising either a XOR gate or an XNOR gate: a first bit of the first value; and a first bit of the second value; receiving as inputs at a configuration comprising a layer of at least one AND gate and a layer of at least one OR gate: a second bit of the first value; a second bit of the second value; a third bit of the first value; and a third bit of the second value; receiving as inputs at a second gate comprising either a XOR gate or an XNOR gate: an output of the first gate; and an output of the configuration; and outputting from the second gate a first bit of the third value.

BRIEF DESCRIPTION OF THE DRAWINGS

FIG. 1A is a highly simplified schematic view of a neuron;

DETAILED DESCRIPTION

According to embodiments of the application, a method and logic circuitry for processing a pair of output values from a state update circuit is provided. As in the proposed PRNG discussed above, two values of state are produced, i.e. a first value and a second value. A first one of the pair of output values is stored in a first register. A second of the pair of output values is stored in a second register. The values held in the register are updated to new values following each iteration of the state update circuit. The first value and the second value are processed by logic circuitry according to embodiments of the application to produce a third value. The third value is stored in a third register before being output by the PRNG.

Figure 9:
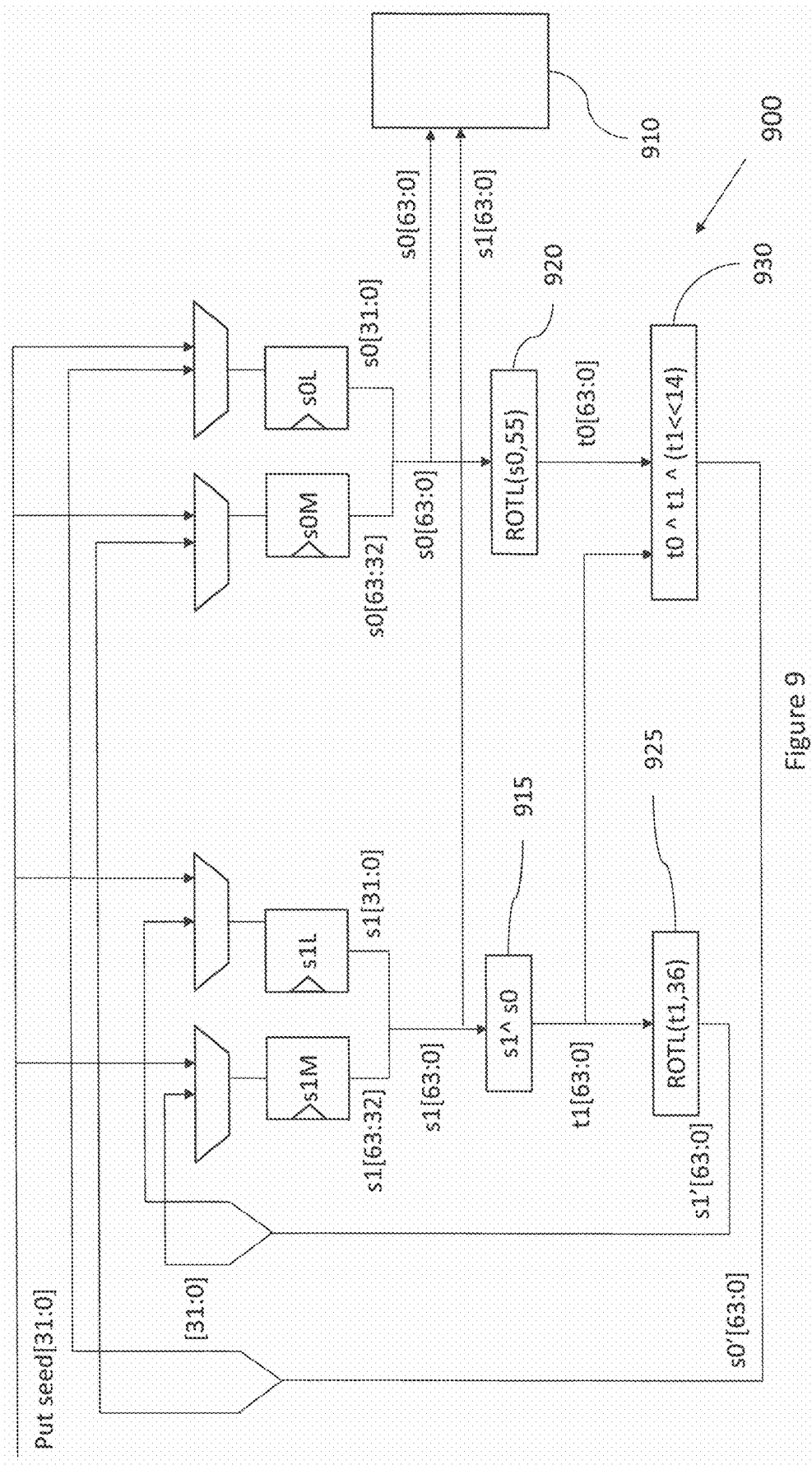
FIG. 9 is a schematic of an example state update circuit.

Reference is made to FIG. 9, which show an example of a state update circuit 900 and the operations that it carries out to generate the state. As shown, a 32 bit seed can be provided to the state update circuit 900 by execution of a put operation. This 32 bit seed is passed to latches, s1M, s1L, s0M, S0L. At these latches, the 128 PRNG state is initialised from the 32 bit seed. Each of the 32 bits generated at these latches may be calculated from the 32 bit seed in the following manner:

s0[31:0]=seed[31:0]
s0[63:32]=~seed[31:0]
s1[31:0]=(seed[31:0]<<13)|(~seed[31:0]>>19)
s2[63:32]=(~seed[31:0]<<13)|(seed[31:0]>>19)

(Where '~' represents a bitwise NOT operation, and '|' represents a bitwise 'OR' operation) These operations yield two 64 bit state values (s0[63:0]) and s1[63:0]) that are fed into the state post processing circuit 910.

In this example, a 32-bit seed initialization is used. However, in other examples, different lengths of seed may be used for the initialisation. In some examples, it is also possible to seed the entire 128-bits of PRNG state to any value, writing s1M, s1L, s0M and s0L in turn with separate instructions.

Many different threads requiring random numbers from the PRNG may be scheduled to run on a processor. Each thread has its own PRNG state so that the pseudo-random number sequences remain independent of thread scheduling. Thus there will normally be a significant time and memory cost to saving and restoring all 128-bits of PRNG state every time a new thread is scheduled. The special 32-bit seed initialization described above is a short-cut allowing the programmer to avoid these overheads by synthesising a 32-bit value unique to each thread (for example, a vertex id concatenated with an iteration count) and then causing the PRNG to iterate a number of times. If a new seed is synthesised in this manner every time a thread is starts, then there is then no need to save the PRNG state to memory when the thread finishes. Instead, the new 32-bit seed that is generated following the iterations may be saved and used to restore the 128 bits of state at the latches (s1M, s1L, s0M, S0L), as described above.

The state update circuit 900, comprises a set of functions that are used to update the two 64 bit state values that can be used to generate new random number values. A first function 915 involves performing a XOR operation with s1 and s0 to produce an output t1 [63:0].

A second function 920 involves performing a rotate left operation on s0 by 55 bits to produce an output t0[63:0]. This second function 920 may also be represented by a left shift by 55 bits, a right shift by 9 bits, and a bitwise logical OR operation to combine the results of these two shift operations.

A third function 925 involves performing a rotate left operation on t1 by 36 bits. This third function 925 may also be represented by a left shift by 36 bits, a right shift by 28 bits and a bitwise logical OR operation to combine the results of these two shift operations. The third function 925 produces the output s1'.

A fourth function 930 involves performing a XOR operation between t0, t1, and t1 shifted left by 14 bits. The fourth function 930 produces the output s0'.

Each of the 64 bit outputs from the third function 925 and the fourth function 930 are split into 32 bits so that they may be fed back into the start of the circuit 900 to be updated again. This time the 32 bits from the s1' and s0' outputs are provided as inputs into the latches s1M, s1L, s0M, S0L instead of the seed to provide a new 128 bits of state.

The state update circuit 900 may continue its operations in a loop and output sets of 64 bits of state to the state post processing circuit 910.

This state update circuit 900 may be configured to provide the first of these values (s0) to a first register in the state post processing circuit 910 and a second of these values (s1) to the second register in the state post processing circuit 910. The state post processing circuit 910 comprises sets of combinatorial logic for processing the first value (s0) and the second value (s1). The sets of combinatorial logic are configured to combine three pairs of bits from the first value and the second value to produce a single bit of the third value. Each bit of the third value is calculated by combining a unique combination of three pairs of bits from the first and second value. By doing so, each third value that is produced is a non-linear function of the previous values output from the random number generator. Furthermore, the need for the computationally expensive add function is eliminated.

Figure 10:
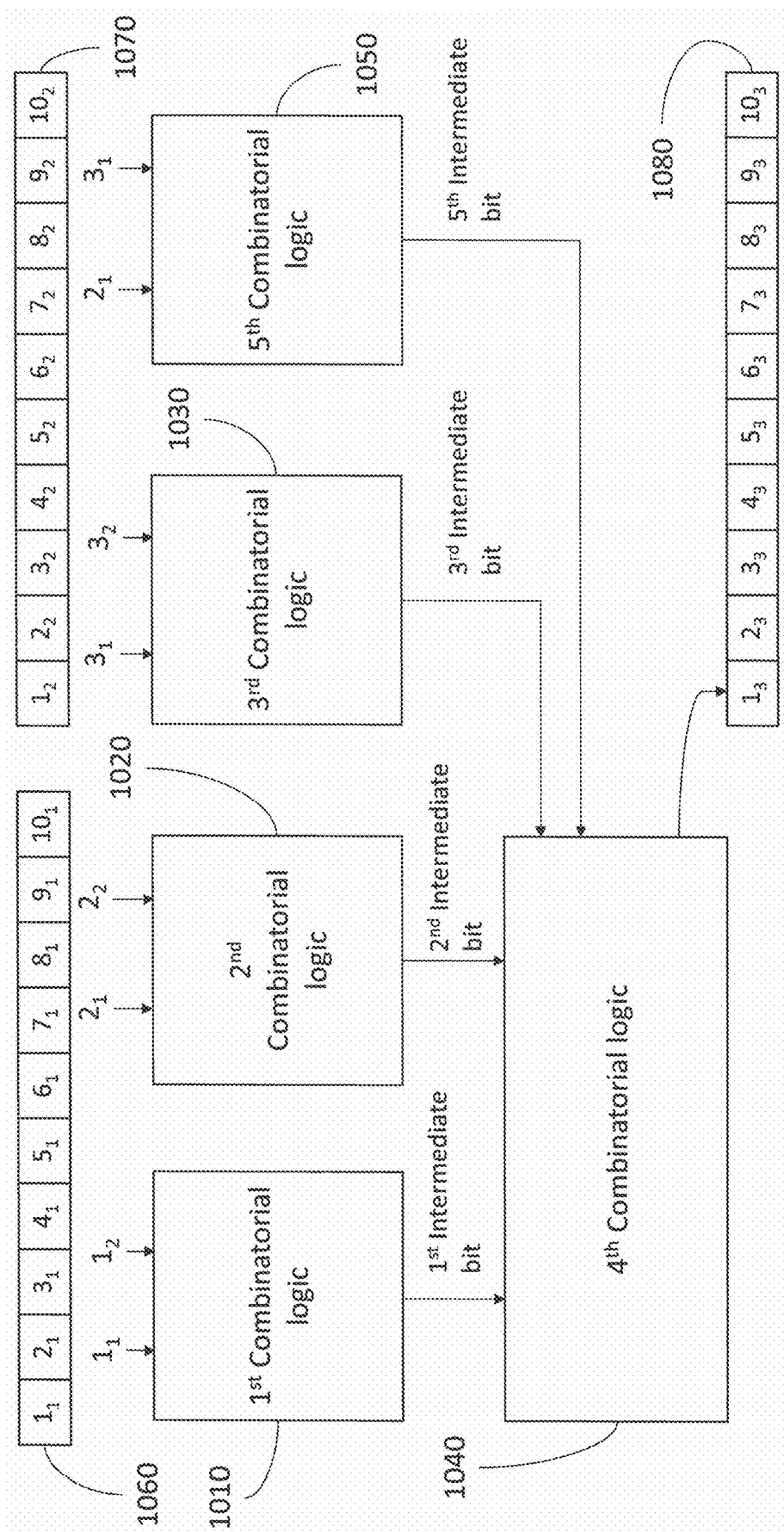
FIG. 10 is schematic of an example state post processing circuit.

Reference is made to FIG. 10, which illustrates the sets of combinatorial logic that are part of the state post processing circuit 910. The circuit includes a first register 1060 for holding the first value, a second register 1070 for holding the second value, and a third register 1080 for holding the third value. For convenience, each of these registers are shown as having only ten bits. However, the values are likely to include a greater number of bits (e.g. 64 bits). In FIG. 10, $1_1$ represents the $1^{st}$ bit of the first value, with $2_1$ representing the $2^{nd}$ bit of the first value and so on. Similarly $1_2$ represents the first bit of the second value, and $1_3$ represents the $1^{st}$ bit of the third value. It would be appreciated by the skilled person, that the reference to "first", "second", and "third" values does not necessarily imply that those values are the "first", "second", and "third" values in the bit sequences.

First combinatorial logic 1010 is configured to receive a first pair of bits ($1_1$ and $1_2$) from corresponding locations in the first and second values and to generate a first intermediate bit therefrom. For example, the first combinatorial logic 1010 may be configured to receive bits 63 from s0 and s1. The first combinatorial logic 1010 could be a 'XOR' gate or an 'XNOR' gate.

Second combinatorial logic 1020 is configured to receive a second pair of bits ($2_1$ and $2_2$) from corresponding locations in the first and second values and to generate a second intermediate bit. For example, the second combinatorial logic may be configured to receive bits 62 from s0 and s1. The second combinatorial logic could be an 'AND' or an 'OR' gate.

Third combinatorial logic 1030 is configured to receive a third pair of bits ($3_1$ and $3_2$) at corresponding locations in the first and second values and to generate a third intermediate bit. For example, the third combinatorial logic may be configured to receive as inputs bits 61 from s0 and s1. The third combinatorial logic could be an 'AND' or an 'OR' gate.

Fourth combinatorial logic 1040 is configured to receive, the first, second, and third intermediate bits and to generate therefrom a result bit ($1_3$) of a third value. The fourth combinatorial logic 1040 comprises an 'AND' gate or an 'OR' gate. The fourth combinatorial logic 1040 generates from the second and third intermediate bit, a fourth intermediate bit.

This fourth intermediate bit is generated by the 'AND' gate or the 'OR' gate. The fourth combinatorial logic 1040 also comprises a 'XOR' gate or a 'XNOR' gate. The 'XOR' gate or 'XNOR' gate receives the fourth intermediate bit and the first intermediate bit and generates therefrom a result bit ($1_3$). The fourth combinatorial logic may be configured to output the result bit into the third register 1080 at a location in the third value that corresponds to the location of the first pair of bits ($1_1$ and $1_2$)

Optionally, fifth combinatorial logic 1050 may be provided in the state post processing circuit 1000. This fifth combinatorial logic 1050 is configured to receive the same bit ($2_1$) from the first value that is also received at the second combinatorial logic 1020. Therefore, in the example given above, where the second combinatorial logic 1020 receives bit 62 from the first value, the fifth combinatorial logic 1050 also receives this same bit. The fifth combinatorial logic 1050 is also configured to receive the same bit ($3_1$) from the first value that is also received at the third combinatorial logic 1030. Therefore, in the example given above, where the third combinatorial logic receives bit 61 from first value, the fifth combinatorial logic 1050 also receives the same bit. The fifth combinatorial logic 1050 is configured to generate from these bits, a fifth intermediate bit and to output the fifth intermediate bit to the fourth combinatorial logic 1040, which calculates the result bit ($1_3$) also in dependence upon the fifth intermediate bit. In this case, the fifth intermediate bit is used by 'AND' or 'OR' gates in the fourth combinatorial logic 1040 to generate the fourth intermediate.

Each pair of bits from the first value and the second value are used in the calculation of three different bits of the third value. Each pair of bits effectively functions as a first pair, second pair and third pair for calculating three different respective bits of the third value. For example, the third pair of bits ($3_1$ and $3_2$) shown are used as inputs in the third combinatorial logic 1030 for generating a first bit ($1_3$) of the third value as shown. The third pair of bits ($3_1$ and $3_2$) may also be used as inputs into the second combinatorial logic 1020 for generating the second bit ($2_3$) of the third value. The third pair of bits ($3_1$ and $3_2$) may also be used as inputs into the first combinatorial logic 1010 for generating the third bit ($3_3$) of the third value.

Using the third pair of bits ($3_1$ and $3_2$) as an input into the second combinatorial logic 1020 and third combinatorial logic 1030 involves inputting the third pair of bits into a single AND or OR gate. This result is reused to calculate two different bits of the third value. This scheme achieves uniformity and also helps to minimise the logic required since many initial AND and OR gates can be shared between inputs.

The state processing circuit 1000 comprises, in the sets of combinatorial logic, one or more 'OR' gates and the one or more 'AND' gates. These 'AND' and 'OR' gates are part of a configuration in which the order of the 'OR' gates and the 'AND' gates may be reversed without changing the result of the function. The configuration comprises a first layer comprising either 'AND' or 'OR' gates and a second layer comprising either an 'AND' or an 'OR' gate. The first layer—which belongs to the second 1020, third 1030 and (optionally) the fifth 1050 combinatorial logic—receives the second and third bits ($2_1$, $2_2$, $3_1$, and $3_2$) as inputs and provides outputs to the second layer (which belongs to the fourth combinatorial logic 1040). The second layer provides an output to a 'XOR' or 'XNOR' gate in the fourth combinatorial logic 1040.

Possible arrangements of the logic gates in the state post processing circuit 1000, will now be described with reference to FIGS. 5 to 8.

Figure 5:
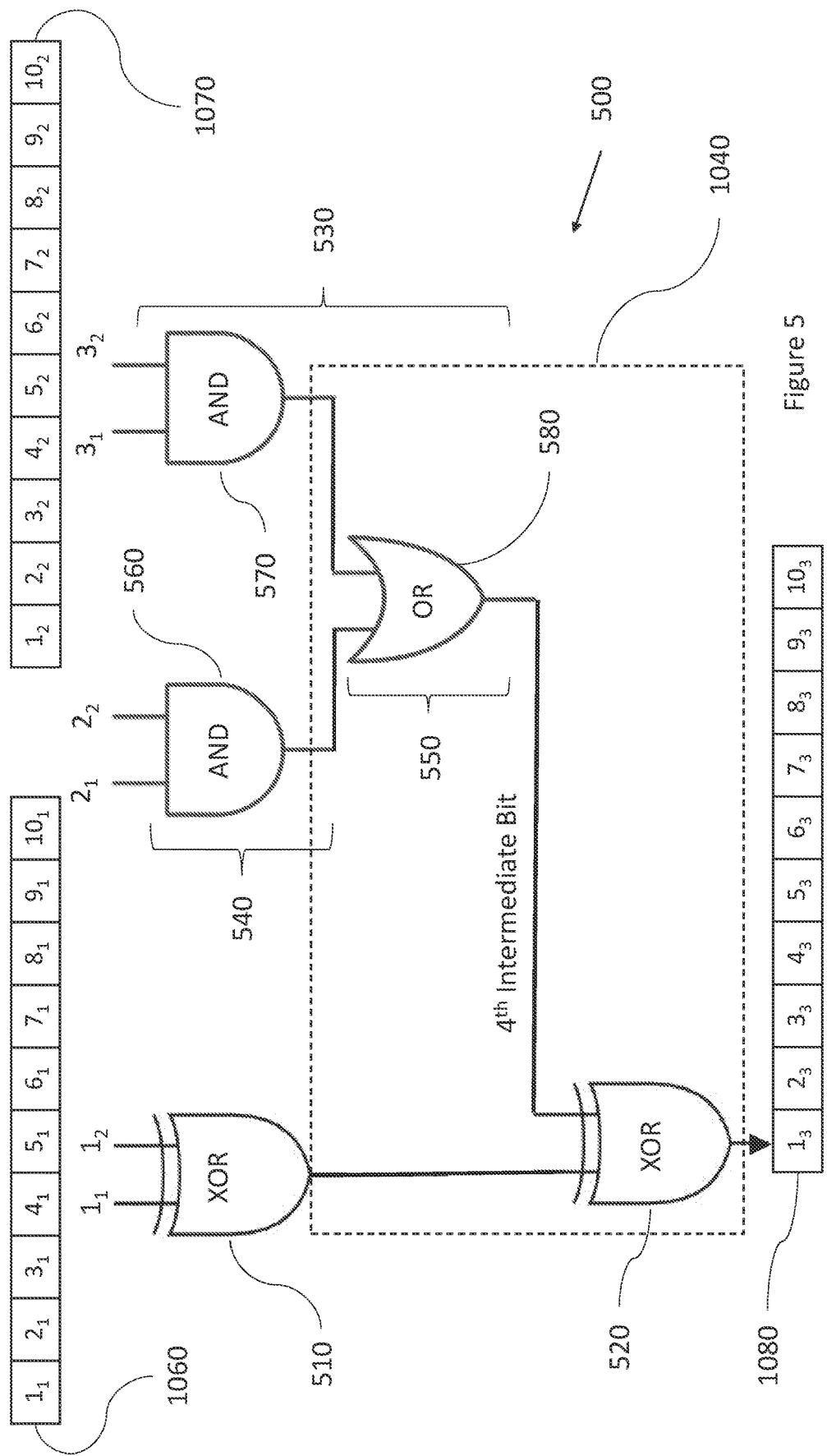
FIG. 5 is a schematic of an example circuit illustrated by logic gates for processing output values of the state update circuit.

Reference is made to FIG. 5, which shows an example of a possible state post processing circuit 500 according to embodiments of the application. The circuit 500 comprises a first 'XOR' gate 510 that is configured to receive as inputs, the first bits ($1_1$ and $1_2$) of the first and second values, and to provide an output to a second 'XOR' gate 520. Although the first 'XOR' gate 510 and the second 'XOR' gate 520 are presented here as 'XOR' gates, in other examples, they may be 'XNOR' gates. The first 'XOR' gate 510 belongs to the first combinatorial logic 1010. The second 'XOR' gate 520 belongs to the fourth combinatorial logic 1040.

The circuit 500 comprises a configuration 530 of 'AND' and 'OR' gates. The configuration 530 comprises a first layer 540 comprising two 'AND' gates 560, 570, and a second layer 550 comprising an 'OR' gate 580. The 'OR' gate 580 belongs to the fourth combinatorial logic 1040. The 'AND' gate 560 belongs to the second combinatorial logic 1020. The 'AND' gate 570 belongs to the third combinatorial logic 1030.

The 'AND' gate 560 is configured to receive as inputs, the second bits ($2_1$ and $2_2$) of the first and second values and provide an output to the 'OR' gate 580. The 'AND' gate 570 is configured to receive as inputs, the third bits ($3_1$ and $3_2$) of the first and second values and to provide an output to the 'OR' gate 580.

The 'OR' gate 580 is configured to receive the inputs from the 'AND' gate layer 540 and to provide its output to the second 'XOR' gate 520. The second 'XOR' gate 520 provides as an output, the first bit ($1_3$) of the third value.

Figure 4:
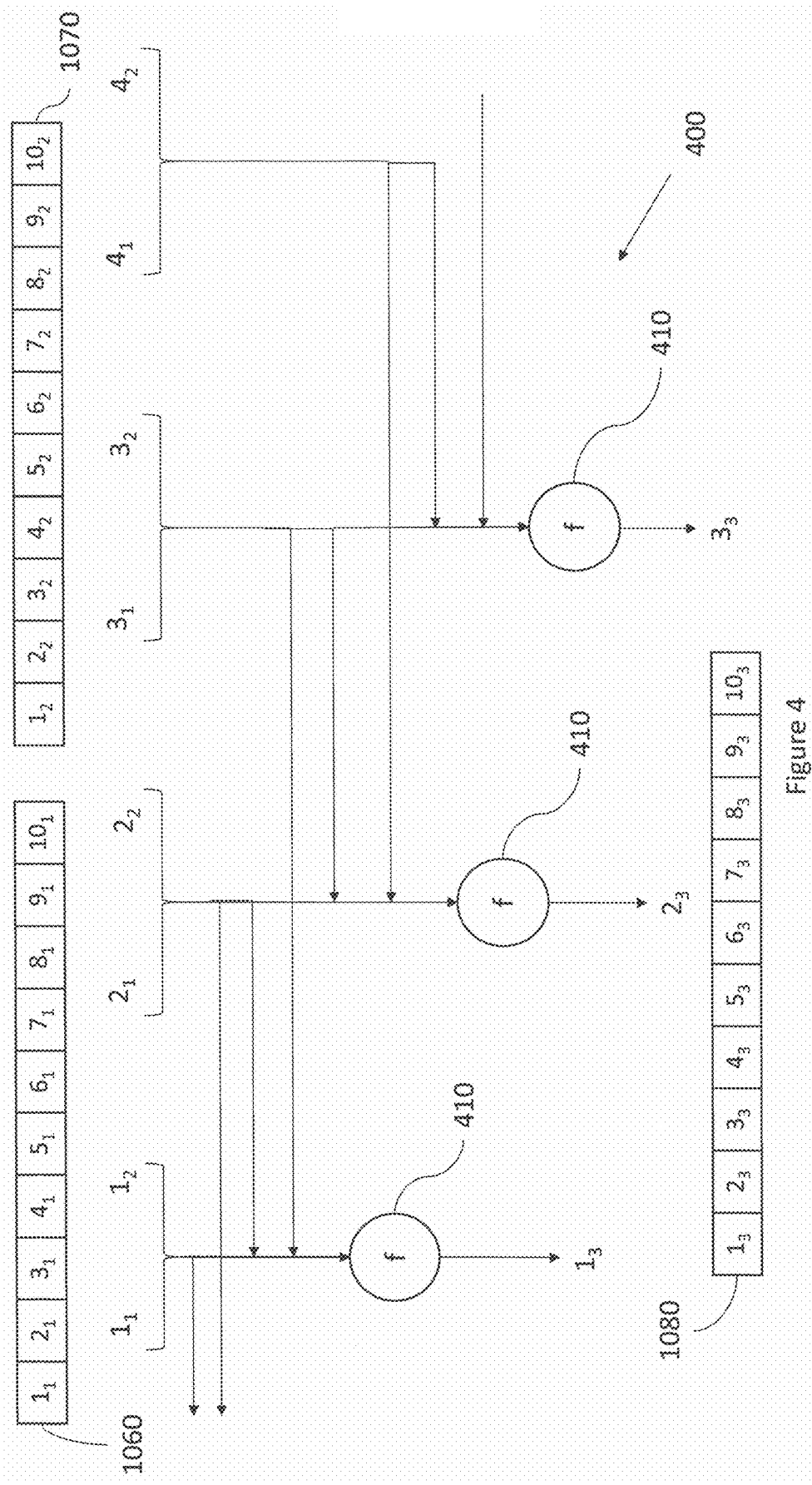
FIG. 4 illustrates the dependence of a third value on values output from the state update circuit.

A plurality of copies of the circuit 500 may be used to provide all the bits of the third value, in the manner explained below with reference to FIG. 4.

Figure 6:
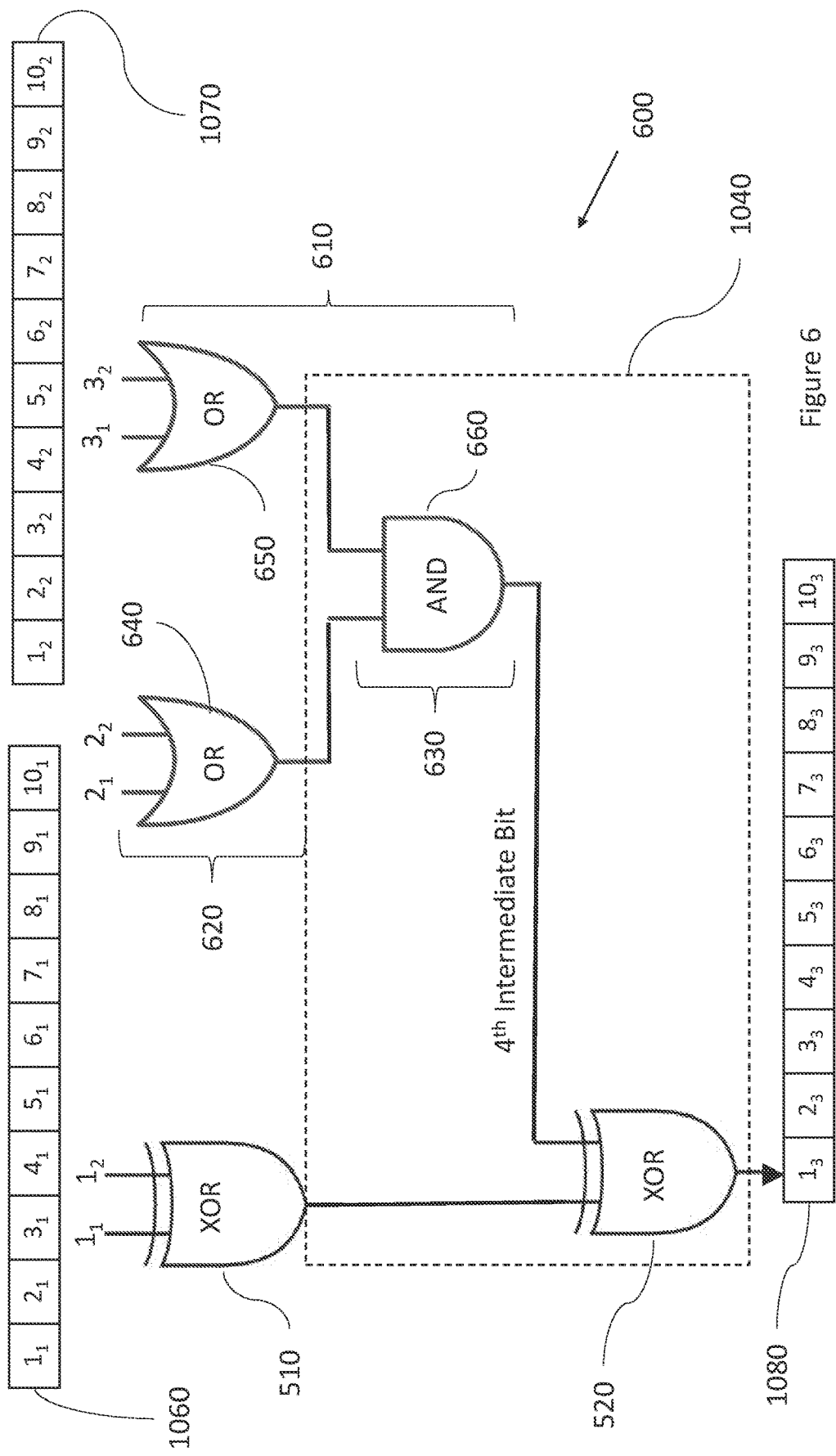
FIG. 6 is a schematic of an example circuit illustrated by logic gates for processing output values of the state update circuit.

Reference is made to FIG. 6, which illustrates an example state post processing circuit 600 according to other embodiments of the application. Like elements are referred to with like reference numerals.

In this case, the configuration 610 of 'AND' and 'OR' gates comprises a first layer 620 of 'OR' gates 640, 650 and a second layer 630 of an 'AND' gate 660. The 'OR' gate 640 belongs to second combinatorial logic 1020. The 'OR' gate 650 belongs to third combinatorial logic 1030. The 'AND' gate 660 belongs to fourth combinatorial logic 1040.

Therefore, in this case, the position of the 'OR' gates and 'AND' gates has been swapped with respect to their positions in the configuration 530 of the circuit 500 shown in FIG. 5.

The 'OR' gate 640 is configured to receive as inputs, the second bits ($2_1$ and $2_2$) of the first and second values and provide an output to the 'AND' gate 660. The 'OR' gate 650 is configured to receive as inputs, the third bits ($3_1$ and $3_2$) of the first and second values and provide an output to the 'AND' gate 660.

The 'AND' gate 660 is configured to receive the inputs from the 'OR' gate layer 620 and to provide its output to the second 'XOR' gate 520. The second 'XOR' gate 520 provides, as an output, the first bit ($1_3$) of the third value.

A plurality of copies of the circuit 600 may be used to provide all the bits of the third value, in the manner explained below with reference to FIG. 4.

Figure 7:
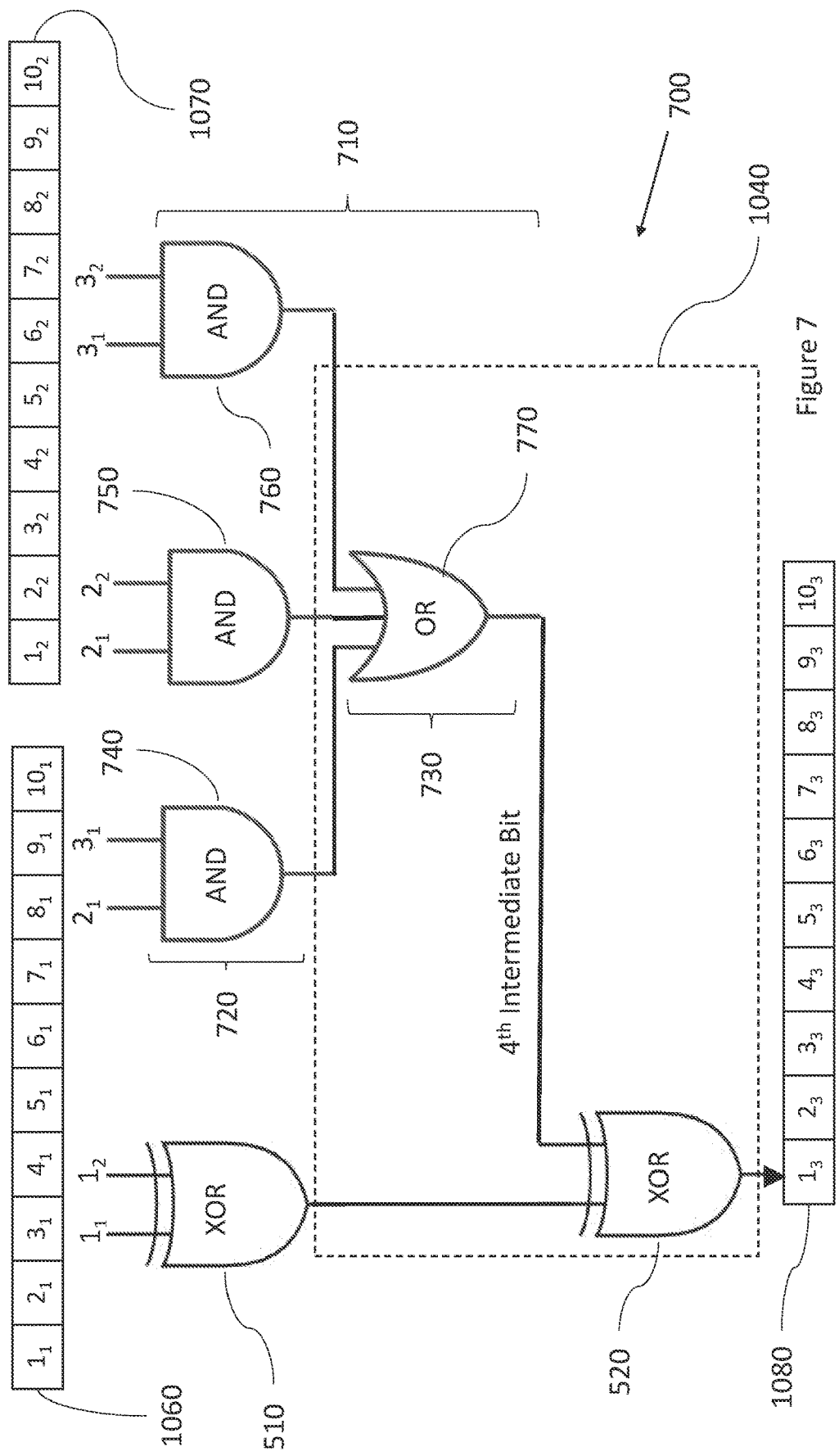
FIG. 7 is a schematic of an example circuit illustrated by logic gates for processing output values of the state update circuit.

Reference is made to FIG. 7, which shows another example of a state post processing circuit 700 according to embodiments of the application Like elements are referred to using like reference numerals.

The circuit 700 comprises a configuration 710 of 'AND' and 'OR' gates. The configuration 710 comprises a first layer 720 comprising three 'AND' gates 740, 750, 760, and a second layer 730 comprising an 'OR' gate 770. The 'AND' gate 750 belongs to second combinatorial logic 1020, the 'AND' gate 760 belongs to third combinatorial logic 1030, and the 'AND' gate 740 belongs to fifth combinatorial logic 1050. The 'OR' gate 770 belongs to fourth combinatorial logic 1040.

The 'AND' gates 750, 760 receive the same inputs as the 'AND' gates 560, 570, shown in FIG. 5. In this circuit 700, however, the additional 'AND' gate 740 is included. The 'AND' gate 740 receive as inputs, the second bit ($2_1$) of the first value and the third bit ($3_1$) of the first value and provides its output to the 'OR' gate 770.

The 'OR' gate 770, in this example, is a three-input 'OR' gate that is configured to receive its inputs from the 'AND' gates 740, 750, 760.

The 'OR' gate 770 provides its output to the second 'XOR' gate 520 which outputs the first bit ($1_3$) of the third value.

A plurality of copies of the circuit 700 may be used to provide all the bits of the third value, in the manner explained below with reference to FIG. 4.

Figure 8:
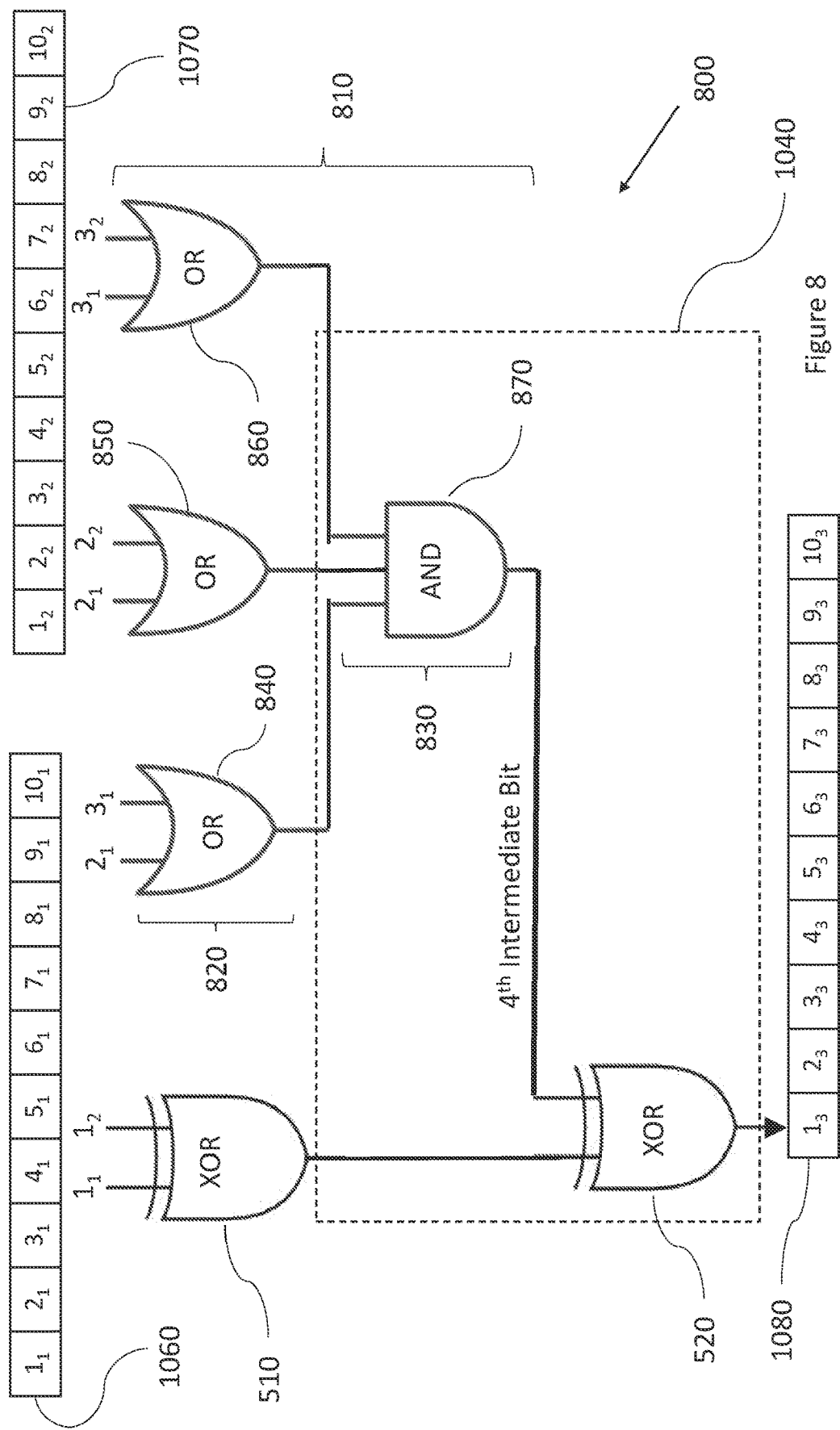
FIG. 8 is a schematic of an example circuit illustrated by logic gates for processing output values of the state update circuit.

Reference is made to FIG. 8, which shows an example of a state post processing circuit 800 according to embodiments of the application. Like elements are referred to with like reference numerals.

In this case, the configuration 810 of 'AND' and 'OR' gates comprises a first layer 820 of 'OR' gates 840, 850, 860 and a second layer 830 of an 'AND' gate 870. The 'OR' gate 850 belongs to the second combinatorial logic 1020, the 'OR' gate 860 belongs to the third combinatorial logic 1030, and the 'OR' gate 840 belongs to the fifth combinatorial logic 1050. The 'AND' gate 870 belongs to the fourth combinatorial logic 1040. Therefore, in this case, the position of the 'OR' gates and 'AND' gates has been swapped with respect to their positions in the configuration 710 of the circuit 700 shown in FIG. 7.

The 'OR' gates 850, 860 receive the same inputs as the 'OR' gates 640, 650, shown in FIG. 7. In this circuit 800, however, the additional 'OR' gate 840 is included. The 'OR' gate 840 receive as inputs, the second bit ($2_1$) of the first value and the third bit ($3_1$) of the first value and provides its output to the 'AND' gate 870.

The 'AND' gate 870 in this example is a three-input 'AND' gate that is configured to receive its inputs from the 'OR' gates 840, 850, 860.

The 'AND' gate 870 provides its output to the second 'XOR' gate 520 which outputs the first bit ($1_3$) of the third value.

A plurality of copies of the circuit 800 may be used to provide all the bits of the third value, in the manner explained below with reference to FIG. 4.

Compared with the circuits 500 and 600, shown in FIGS. 5 and 6, the circuits 700 and 800, shown in FIGS. 7 and 8, require more hardware resources, since the circuits 700 and 800 introduce an additional 'AND' gate or an additional 'OR' gate. However, the circuits 700 and 800 have the advantage that the distribution of output values is more uniform.

Each of the circuits 500, 600, 700, 800, may be used to perform post processing on the state output from a state update circuit to provide 64 bit random numbers. The distribution of 64 bit outputs from these circuits may, however, retain small amounts of non-uniformity. To create a perfectly uniform output, however, two cyclically adjacent bits may be removed from each of the 64 bit outputs to create a perfectly uniform distribution of 62 bit outputs.

Therefore, in some embodiments, additional circuity is added to any of the circuits 500, 600, 700, and 800 to remove two cyclically adjacent bits from the 64 bit output.

As illustrated by FIGS. 5-8 and 10, each bit of the third value is a function of 3 bits of both of the input values. Reference is made to FIG. 4, which illustrates the relationship between bits of the third value and the two input values.

The Figure shows how the bits of the third value depend upon the bits of the first and second value. The first bit ($1_3$) of the third value is calculated as a function 410 of the first bits ($1_1$ and $1_2$) of the first and second values, the second bits ($2_1$ and $2_2$) of the first and second values, and the third bits ($3_1$ and $3_2$) of the first and second values. The function 410 is the set of operations implemented by any of the state post processing circuits 500, 600, 700, and 800 shown in FIGS. 5 to 8.

The second bit ($2_3$) of the third value is calculated by applying the same function 410 that was used to calculate the first bit ($1_3$) of the third value. This time, the inputs to the function 410 are the second bits ($2_1$ and $2_2$) of the first and second value, the third bits ($3_1$ and $3_2$) of the first and second value, and the fourth bits ($4_1$ and $4_2$) of the first and second value. In this way, each bit of the third value is a function 410 of three pairs of bits of the first and second values. In some examples, the calculation of the third value may be performed in a ring. In this case, the least significant bit of the third value is calculated as a function 410 of: the least significant bits of the first and second values, the most significant bits of the first and second values, and the second most significant bits of the first and second values. In this case, the reference to the 'first', 'second', and 'third' value may be understood to refer to bits that are sequential to one another in the first, second, and third value.

However, it is not necessary for the 'first', 'second', and 'third' values to be sequential to one another, so long as each bit of the third value is calculated using a unique combination of 3 bit pairs from the first and second value. In some embodiments, the first ($1_1$), second ($2_1$), and third bits ($3_1$) of the first value that are used to calculate the first bit ($1_3$) of the third value may be taken from any position in the first value and need not be adjacent to one another. Similarly, the first ($1_2$), second ($2_2$), and third ($3_2$) bits of the second value may be taken from any position in the second value and need not be adjacent to one another.

The function 410 may be repeatedly implemented by respective physical circuits providing the logic gates. The respective circuits may be used to calculate different bits of the third value. Each pair of bits from the first and second values may be applied to the first combinatorial logic 1010 of the function 410, the second combinatorial logic 1020 of the function 410, and the third combinatorial logic 1030 of the function 410 for generating three respective bits of the third value. Since the second combinatorial logic 1020 and the third combinatorial logic 1030 involve the same function (i.e. either both are AND gates or both are OR gates), the calculations performed by the second combinatorial logic 1020 and third combinatorial logic 1030 are only performed once for each pair of bits, with the result being reused. This enables the number of AND gates and OR gates to be reduced.

FIGS. 5 to 8 have already illustrated how the first bit ($1_3$) of the third value 1080 is calculated. When calculating the second bit ($2_3$) of the third value 1080, the second pair of bits ($2_1$ and $2_2$) is used as an input into the first gate 510. The third pair of bits ($3_1$ and $3_2$) is used as an input into the configuration of AND/OR gates. However, since the third pair of bits is also input into the configuration when calculating the first bit ($1_3$) of the third value, the same result from the first AND/OR operation of the configuration is used when calculating the second bit ($2_3$) of the third value. Additionally, the fourth pair of bits ($4_1$ and $4_2$) is used as an input into the configuration of AND/OR gates. Therefore, the second bit ($2_3$) of the third value is calculated in dependence upon the second ($2_1$ and $2_2$), third ($3_1$ and $3_2$), and fourth ($4_1$ and $4_2$) bit pairs.

When calculating the third bit ($3_3$) of the third value, the third pair of bits ($3_1$ and $3_2$) is used as an input into the first gate 510. The fourth pair of bits ($4_1$ and $4_2$) is used as an input into the configuration of AND/OR gates. However, since the fourth pair of bits is also input into the configuration when calculating the second bit ($2_3$) of the third value, the same result from the first AND/OR operation of the configuration is used when calculating the third bit ($3_3$) of the third value. Additionally, the fifth pair of bits ($5_1$ and $5_2$) is used as an input into the configuration of AND/OR gates. Therefore, the third bit ($3_3$) of the third value is calculated in dependence upon the third ($3_1$ and $3_2$), fourth ($4_1$ and $4_2$), and fifth ($5_1$ and $5_2$) bit pairs.

Therefore, it may be understood from these examples, that each pair of bits is used as an input into the first gate for generating a bit of the third value and the configuration for generating two further bits of the third value. Furthermore, each bit of the third value is calculated in dependence upon a unique set of 3 pairs of bits. The sets of bit pairs used to calculate a particular bit of the third value, need not be taken from adjacent positions in the second and third value, but could be taken from different positions.

Figure 1:
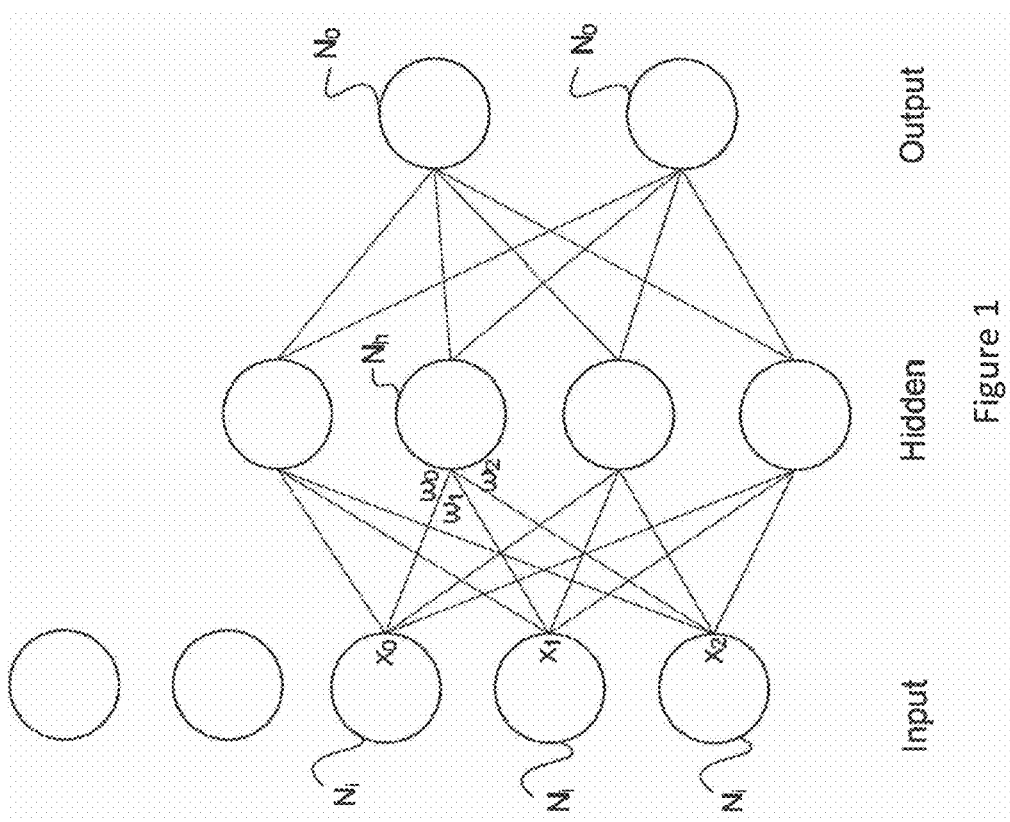
FIG. 1 is a highly simplified schematic view of a neural net.
Figure 2:
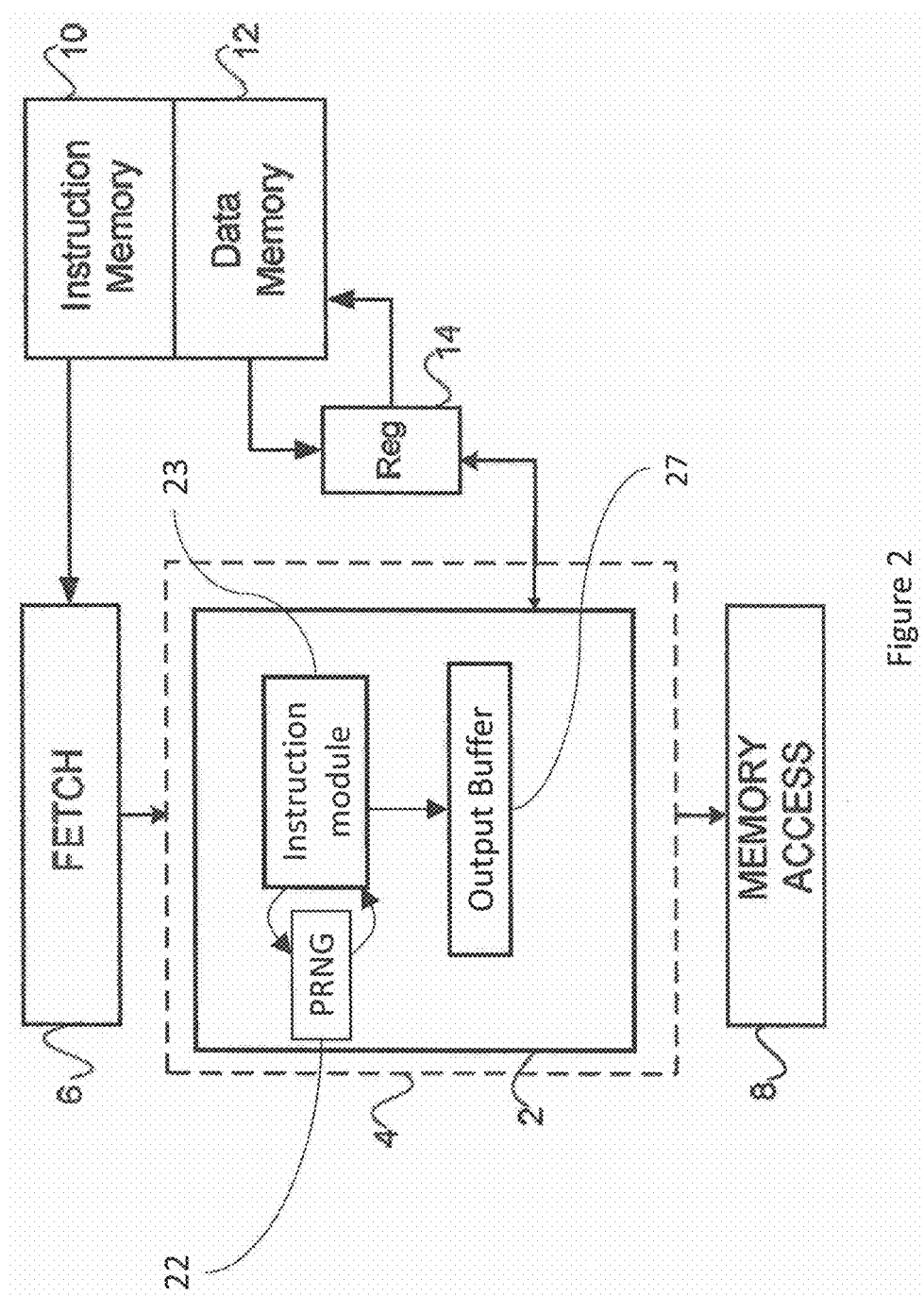
FIG. 2 is a schematic diagram of a processing unit in accordance with an embodiment of the invention.
Figure 3:
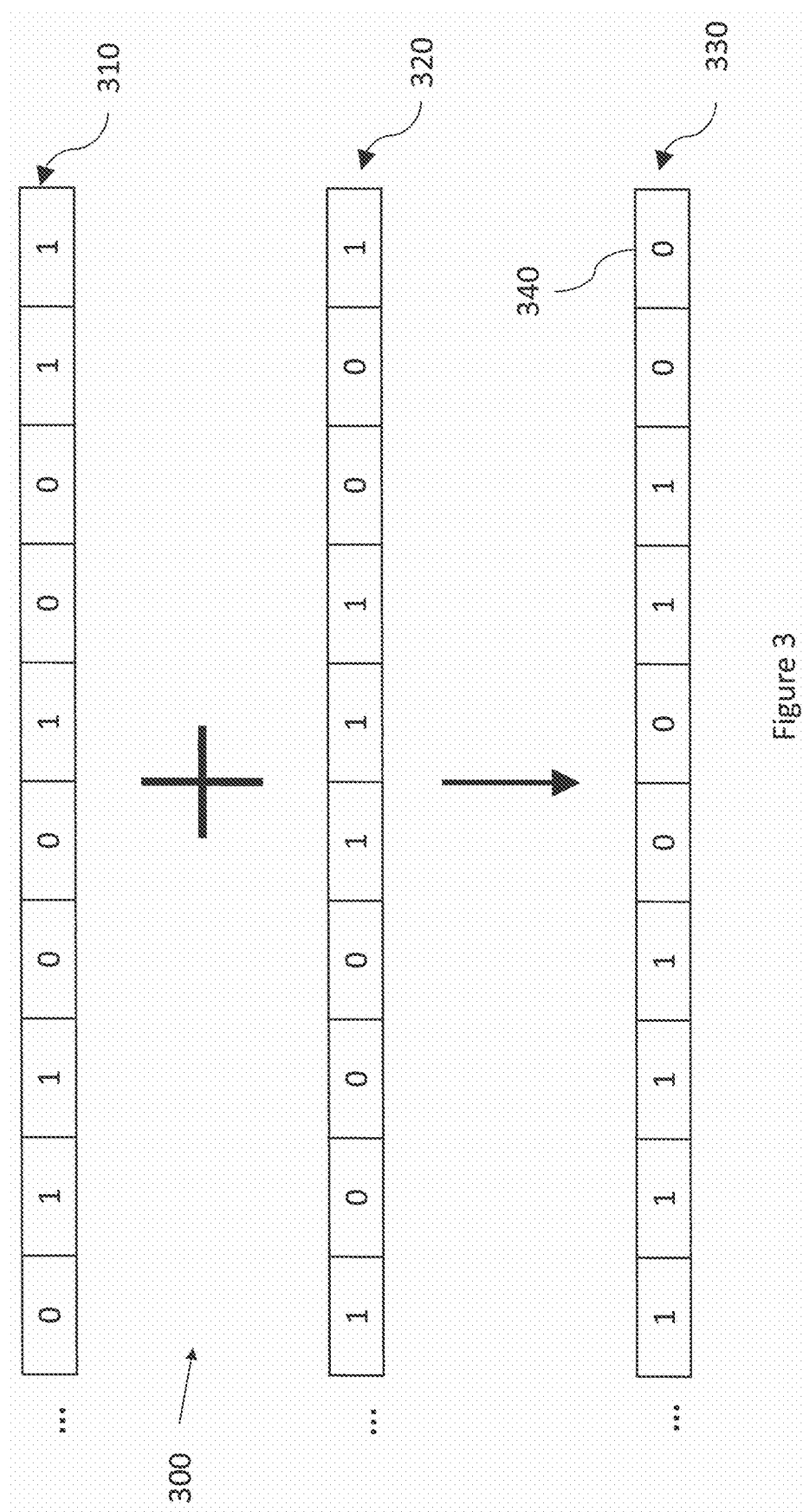
FIG. 3 illustrates a proposed post processing operation.

Reference is made to FIG. 2 which illustrates an example of the use of a PRNG as described. FIG. 2 shows a schematic block diagram of an execution unit 2 arranged to execute a single instruction for generating random values from a predetermined probability distribution.

The execution unit 2 forms part of a pipeline 4 in a processing unit. The processing unit comprises an instruction fetch unit 6 which fetches instructions from an instruction memory 10. The processing unit also comprises a memory access stage 8 which is responsible for accessing a data memory 12 for loading data from the memory or storing data into the memory. A set of registers 14 is provided for holding source and destination operands for the instructions being executed at any instance by the pipeline 4. It will readily be understood that the pipeline 4 may contain many different types of execution unit for executing a variety of different instructions, for example for performing mathematical operations. One type of processing unit which may be useful with the present invention is a processing unit using barrel-threaded time slots, in which a supervisor thread may allocate different worker threads to different time slots for their execution.

The execution unit 2 comprises an instruction execution module 23 and an output buffer 27 for holding the result of execution of the instruction.

The execution unit 2 also comprises a hardware pseudo random number generator 22 which generates pseudo random numbers when requested by the instruction. The instruction used to generate random numbers is referred to as a 'rand' instruction. When any 'rand' instruction is executed, the state of a worker thread's PRNG is advanced implicitly by two steps. Only one rand instruction can be issued per clock cycle. There are different types of rand instruction that may be executed by the instruction execution module 23 resulting in random numbers of different lengths and/or having a different distribution over the range.

The instruction 'urand32 $aDst' returns a 32-bit, regularly distributed integer. Two 32-bit integers may be derived from the 64-bit result from the PRNG discussed above.

The instruction 'urand64 $aDst' returns a 64-bit, regularly distributed integer. The 64-bit result from the PRNG discussed above is used as the result of this instruction.

There are different types of instruction that may be used to generate random numbers according to a non-uniform distribution using the output of the PRNG. For example, the 'GRAND' instruction which is used to generate random, approximately Gaussian, noise may be executed by the instruction module 23.

The instruction 'f16v2grand $aDst' returns two random half-precision floating point format values according to an approximately Gaussian distribution. Each value is derived from a 64-bit output of the PRNG as the sum of twelve, unsigned 5-bit random integers minus 186, converted to half-precision floating point format and divided by 32. For generating values with near Gaussian distribution (i.e. where the probability density function is within 20% of Gaussian up to 3 sigma), a variance of 1 and a mean of zero is used. The cumulative distribution function probability differs from a true Gaussian distribution by less ±0.0024 worst case (about 1%). The actual distribution is best described by an Irwin-Hall distribution, which approximates to a Gaussian distribution.

The instruction '32v2grand $aDst' is the same as the 'f16v2grand $aDst' instruction described above, but it returns two single-precision floating point format and two half-precision floating point format.

Further information about the use of the PRNG for generating Gaussian noise are described in our earlier U.S. application Ser. No. 15/886505, the contents of which are incorporated by reference.

Another possible instruction that may be executed by the instruction execution module is the Rmask instruction, which is used to mask randomly selected values in a vector. As a result of the execution of such instructions, the PRNG 22 generates random numbers that are used for completion of the instructions.

The instruction 'f16v4rmask $aDst $aSrc0 $aSrc1' generates four, 16-bit values. Each value is unmasked randomly with a probability equal to Src1/65536. Masked values are set to 0. The result is returned in $aDst. All bits of Src1 except the least significant 17 bits are ignored by this instruction. If Src1[16:0]>=65536 then P(unmasked)=1. The 64-bit PRNG output is divided into four 16-bit fields to perform this operation.

The instruction 'f32v2rmask $aDst $ aSrc0 $aSrc1' is similar to f16v4mask, but instead results in two 32-bit values.

The Rmask instruction may be used to implement drop connect as described in our earlier U.S. application Ser. No. 15/886331, the contents of which are incorporated by reference.

What is claimed is:

1. A pseudo random number generator comprising:
a first register holding a first value as a bit sequence;
a second register holding a second value as a bit sequence;
a third register for holding a third value representing a pseudo random number;
first combinatorial logic, the first combinatorial logic configured for combining a first pair of bits at corresponding locations in the first and second values to generate a first intermediate bit;
second combinatorial logic for combining a second pair of bits at corresponding locations in the first and second values to generate a second intermediate bit;
third combinatorial logic for combining a third pair of bits at corresponding locations in the first and second values to generate a third intermediate bit; and
fourth combinatorial configured for combining the first intermediate bit, the second intermediate bit, and the third intermediate bit to generate a first bit of a third value
wherein the first combinatorial logic comprises a logic gate of a different type to a logic gate of the second combinatorial logic,
wherein the pseudo random number generator is configured to apply a same function implemented by the first combinatorial logic, the second combinatorial logic, the third combinatorial logic, and the fourth combinatorial logic to calculate each bit of the third value,
wherein the pseudo random number generator is configured to apply the same function to calculate each bit of the third value by using, for each calculated bit of the third value, a unique set of three bits from the first value and a unique set of three bits from the second value.

2. A pseudo random number generator as claimed in claim 1, comprising fifth combinatorial logic configured to combine a fourth pair of bits of the first value to generate a fifth intermediate bit, wherein one of the bits of the fourth pair also belongs to the second pair of bits and the other of the bits of the fourth pair also belongs to the third pair of bits wherein the function is additionally implemented by the fifth combinatorial logic.

3. A pseudo random number generator as claimed in claim 1, wherein the fourth combinatorial logic is configured to:
combine the second intermediate bit and the third intermediate bit to form a fourth intermediate bit; and
combine the first intermediate bit with the fourth intermediate bit to form the first bit of the third value.

4. A pseudo random number generator as claimed in claim 1, comprising multiple sets of the first combinatorial logic, the second combinatorial logic, the third combinatorial logic, and the fourth combinatorial logic, wherein each set is used to calculate a different bit of the third value.

5. A pseudo random number generator as claimed in claim 4, wherein each pair of bits at corresponding locations in the first value and the second value is input to the first combinatorial logic, the second combinatorial logic, and the third combinatorial logic of different sets of the multiple sets to generate three respective bits of the third value.

6. A pseudo random number generator as claimed in claim 1, wherein the first bit is stored at a location in the third value corresponding to the location of the first pair of bits in the first and second value.

7. A pseudo random number generator as claimed in claim 1, comprising a state update circuit configured to update and output state every iteration of the state update circuit, the state comprising the first value and the second value.

8. A pseudo random number generator as claimed in claim 1, wherein the first combinatorial logic comprises either an XOR or an XNOR gate.

9. A pseudo random number generator as claimed in claim 1, wherein the second combinatorial logic comprises either an OR gate or an AND gate.

10. A pseudo random number generator as claimed in claim 1, wherein the third combinatorial logic comprises either an OR gate or an AND gate.

11. A pseudo random number generator as claimed in claim 1, wherein the fourth combinatorial logic comprises a first logic gate configured to receive the second intermediate bit and the third intermediate bit, wherein the first logic gate is an OR gate or an AND gate.

12. A pseudo random number generator as claimed in claim 11, wherein the first logic gate is configured to generate a fourth intermediate bit by combining the second intermediate with the third intermediate bit; and
  a second logic gate configured to receive the first intermediate bit from the first combinatorial logic and the fourth intermediate bit from the first logic gate to generate the first bit of a third value, wherein the second logic gate is a XOR gate.

13. A pseudo random number generator comprising:
a first register holding a first value as a bit sequence;
a second register holding a second value as a bit sequence, wherein the pseudo random number generator further comprises:
a first gate comprising either a XOR gate or an XNOR gate and configured to receive as inputs:
  a first bit of the first value; and
  a first bit of the second value;
a configuration of combinatorial logic comprising a layer of at least one AND gate and a layer of at least one OR gate, said configuration of combinatorial logic being configured to receive as inputs:
  a second bit of the first value;
  a second bit of the second value;
  a third bit of the first value; and
  a third bit of the second value; and
a second gate comprising either a XOR gate or an XNOR gate and configured to receive as inputs:
an output of the first gate; and
an output of the configuration,
wherein the second gate is configured to output a first bit of a third value.

14. A pseudo random number generator as claimed in claim 13, wherein the configuration of combinatorial logic comprises a layer of at least one AND gate and a layer of at least one OR gate, and the layer of at least one AND gate comprises a first AND gate and a second AND gate,
  wherein the layer of at least one OR gate comprises a first OR gate,
  wherein the first AND gate is configured to receive as inputs:
    the second bit of the first value; and
    the second bit of the second value, wherein the second AND gate is configured to receive as inputs:
    the third bit of the first value; and
    the third bit of the second value,
  wherein the first OR gate is configured to receive as inputs:
    an output of the first AND gate; and
    an output of the second AND gate,
  wherein the first OR gate is configured to provide the output of the configuration of combinatorial logic.

15. A pseudo random number generator as claimed in claim 13, wherein the configuration of combinatorial logic comprises a layer of at least one AND gate and a layer of at least one OR gate, and the layer of at least one OR gate comprises a first OR gate and a second OR gate,
  wherein the layer of at least one AND gate comprises a first AND gate,
  wherein the first OR gate is configured to receive as inputs:
    the second bit of the first value; and
    the second bit of the second value,
  wherein the second OR gate is configured to receive as inputs:
    the third bit of the first value; and
    the third bit of the second value;
  wherein the first AND gate configured to receive as inputs:
    an output of the first OR gate; and
    an output of the second OR gate, wherein the first AND gate is configured to provide the output of the configuration of combinatorial logic.

16. A pseudo random number generator as claimed in claim 13, wherein the configuration of combinatorial logic comprises a layer of at least one AND gate and a layer of at least one OR gate, and the layer of at least one AND gate comprises a first AND gate, a second AND gate, and a third AND gate,
  wherein the layer of at least one OR gate comprises a first OR gate,
  wherein the first AND gate is configured to receive as inputs:
    the second bit of the first value; and
    the second bit of the second value,
  wherein the second AND gate is configured to receive as inputs:
    the third bit of the first value; and
    the third bit of the second value,
  wherein the third AND gate is configured to receive as inputs:
    the second bit of the first value; and
    the third bit of the first value,
  wherein the first OR gate is configured to receive as inputs:
    an output of the first AND gate;
    an output of the second AND gate; and
    an output of the third AND gate,
  wherein the first OR gate is configured to provide the output of the configuration of combinatorial logic.

17. A pseudo random number generator as claimed in claim 13, wherein the configuration of combinatorial logic comprises a layer of at least one AND gate and a layer of at least one OR gate, and the layer of at least one OR gate comprises a first OR gate, a second OR gate, and a third OR gate,
  wherein the layer of at least one AND gate comprises a first AND gate,
  wherein the first OR gate is configured to receive as inputs:
    the second bit of the first value; and
    the second bit of the second value,
  wherein the second OR gate is configured to receive as inputs:
    the third bit of the first value; and
    the third bit of the second value,
  wherein the third OR gate is configured to receive as inputs:
    the second bit of the first value; and
    the third bit of the first value,
  wherein the first AND gate is configured to receive as inputs:
    an output of the first OR gate;
    an output of the second OR gate; and
    an output of the third OR gate,
  wherein the first AND gate is configured to provide the output of the configuration of combinatorial logic.

18. A pseudo random number generator as claimed in claim 13, configured to calculate each bit of the third value using a function implemented by the first gate, the configuration of combinatorial logic, and the second gate,
  wherein the pseudo random number generator is configured to use the function to calculate each bit of the third value using a unique set of three bits from the first value and a unique set of three bits from the second value.

19. A pseudo random number generator as claimed in claim 13, comprising multiple sets of the first gate, the configuration of combinatorial logic, and the second gate, wherein the different sets are used to calculate different bits of the third value.

20. A method for generating random numbers comprising:
holding in a first register, a first value as a bit sequence;
holding in a second register, a second value as a bit sequence;
combining a first pair of bits at corresponding locations in the first and second values to generate a first intermediate bit using first combinatorial logic;
combining a second pair of bits at corresponding locations in the first and second values to generate a second intermediate bit;
combining a third pair of bits at corresponding locations in the first and second values to generate a third intermediate bit; and
combining the first intermediate bit, second intermediate bit, and third intermediate bit to generate a first bit of a third value;
applying a same function implemented by the first combinatorial logic, the second combinatorial logic, the third combinatorial logic, and the fourth combinatorial logic to calculate each bit of the third value;
applying the same function to calculate each bit of the third value by using, for each calculated bit of the third value, a unique set of three bits from the first value and a unique set of three bits from the second value,
wherein the first combinatorial logic comprises a logic gate of a different type to a logic gate of the second combinatorial logic.

21. A method for generating random numbers comprising:
holding a first value as a bit sequence;
holding a second value as a bit sequence,
receiving as inputs at a first gate comprising either a XOR gate or an XNOR gate:
a first bit of the first value; and
a first bit of the second value;
receiving as inputs at a configuration of combinatorial logic comprising a layer of at least one AND gate and a layer of at least one OR gate:
a second bit of the first value;
a second bit of the second value;
a third bit of the first value; and
a third bit of the second value;
receiving as inputs at a second gate comprising either a XOR gate or an XNOR gate:
an output of the first gate; and
an output of the configuration; and
outputting from the second gate a first bit of a third value.

22. A non-transitory computer readable medium comprising program instructions which when executed causes a processor to perform a method for generating random numbers, the method comprising:
holding in a first register, a first value as a bit sequence;
holding in a second register, a second value as a bit sequence;
combining a first pair of bits at corresponding locations in the first and second values to generate a first intermediate bit;
combining a second pair of bits at corresponding locations in the first and second values to generate a second intermediate bit;
combining a third pair of bits at corresponding locations in the first and second values to generate a third intermediate bit;
combining the first intermediate bit, second intermediate bit, and third intermediate bit to generate a first bit of a third value;
applying a same function implemented by the first combinatorial logic, the second combinatorial logic, the third combinatorial logic, and the fourth combinatorial logic to calculate each bit of the third value;
applying the same function to calculate each bit of the third value by using, for each calculated bit of the third value, a unique set of three bits from the first value and a unique set of three bits from the second value, and
wherein the first combinatorial logic comprises a logic gate of a different type to a logic gate of the second combinatorial logic.

23. A non-transitory computer readable medium comprising program instructions which when executed causes a processor to perform a method for generating random numbers, the method comprising:
holding a first value as a bit sequence;
holding a second value as a bit sequence, receiving as inputs at a first gate comprising either a XOR gate or an XNOR gate:
a first bit of the first value; and
a first bit of the second value;
receiving as inputs at a configuration comprising a layer of at least one AND gate and a layer of at least one OR gate:
a second bit of the first value;
a second bit of the second value;
a third bit of the first value; and
a third bit of the second value;
receiving as inputs at a second gate comprising either a XOR gate or an XNOR gate:
an output of the first gate; and
an output of the configuration; and
outputting from the second gate a first bit of a third value.

* * * * *